(12) United States Patent
Shijo et al.

(10) Patent No.: US 11,539,216 B2
(45) Date of Patent: Dec. 27, 2022

(54) VOLTAGE CONTROL INVERTER, POWER SOURCE APPARATUS, ENERGY CONTROL SYSTEM, AND VOLTAGE CONTROL METHOD

(71) Applicant: KABUSHIKI KAISHA TOSHIBA, Tokyo (JP)

(72) Inventors: Tetsu Shijo, Tokyo (JP); Qiang Lin, Kawasaki Kanagawa (JP); Hiroshi Uno, Kawasaki Kanagawa (JP); Yasuhiro Kanekiyo, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 17/469,867

(22) Filed: Sep. 8, 2021

(65) Prior Publication Data

US 2022/0294225 A1    Sep. 15, 2022

(30) Foreign Application Priority Data

Mar. 15, 2021  (JP) .............................. JP2021-041737

(51) Int. Cl.
| | |
|---|---|
| *H02J 3/38* | (2006.01) |
| *G05F 1/12* | (2006.01) |
| *H02J 3/40* | (2006.01) |
| *H02M 7/42* | (2006.01) |
| *H02J 3/32* | (2006.01) |

(52) U.S. Cl.
CPC ................ *H02J 3/381* (2013.01); *G05F 1/12* (2013.01); *H02J 3/40* (2013.01); *H02M 7/42* (2013.01); *H02J 3/32* (2013.01); *H02J 2203/10* (2020.01); *H02J 2300/24* (2020.01); *H02J 2300/28* (2020.01)

(58) Field of Classification Search
CPC ...... H02J 3/38; H02J 3/381; H02J 3/40; H02J 2300/28; H02J 2300/24; H02J 2203/10; H02J 3/32; G05F 1/12; H02M 7/42
See application file for complete search history.

(56) References Cited

U.S. PATENT DOCUMENTS 6,597,074 B2    7/2003  Tsujikado et al.
2022/0085607 A1  3/2022  Shijo et al.

FOREIGN PATENT DOCUMENTS

JP   2001-298875 A   10/2001
JP   2002-238184 A    8/2002
(Continued)

OTHER PUBLICATIONS

Y. Noro, "Proposal of Inverter Control Method for Electric Power System Consisting of Energy Storages," IEEEJ Trans. on Power and Energy, vol. 38, No. 11, pp. 854-861 (2018).
(Continued)

*Primary Examiner* — Robert L Deberadinis
(74) *Attorney, Agent, or Firm* — Finnegan, Henderson, Farabow, Garrett & Dunner, LLP

(57) ABSTRACT

According to one embodiment, a voltage control inverter interconnectable with a power system, includes receiving circuitry configured to receive a first control command for outputting a voltage to the power system; and controlling circuitry configured to execute the first control command to output the voltage to the power system. The controlling circuitry is configured to skip to execute the first control command in response to the first control command being received during a period in which the power system is in a first state that is different from a normal state.

13 Claims, 7 Drawing Sheets

(56) References Cited

FOREIGN PATENT DOCUMENTS

| JP | 2004-80919 A | 3/2004 |
| JP | 2005-185070 A | 7/2005 |
| JP | 4173942 B2 | 10/2008 |
| JP | 4680102 B2 | 5/2011 |
| JP | 2014-23229 A | 2/2014 |
| JP | 6020891 B2 | 11/2016 |
| JP | 2022-47353 A | 3/2022 |

OTHER PUBLICATIONS

K. Sakimoto, "Research on virtual synchronous generator control applied to inverter-connected distributed power sources," Osaka University Knowledge Archive (OUKA), https://doi.org/10.18910/52161, 110 pages (2015).

VOLTAGE CONTROL INVERTER, POWER SOURCE APPARATUS, ENERGY CONTROL SYSTEM, AND VOLTAGE CONTROL METHOD

CROSS REFERENCE TO RELATED APPLICATIONS

This application is based upon and claims the benefit of priority from the prior Japanese Patent Application No. 2021-041737, filed on Mar. 15, 2021, the entire contents of which are incorporated herein by reference.

FIELD

Embodiments described herein relate to a voltage control inverter, a power source apparatus, an energy control system, and a voltage control method.

BACKGROUND

A typical voltage control inverter using a control based on a simulated inertial of a power generator (which is called an inertia-simulated control) operates as a voltage source. The voltage control inverter controls an output voltage of the inverter based on drooping characteristics for a power system (power grid) frequency, a power grid voltage, or both of them, thereby keeping a frequency of the power grid. Such a voltage control inverter is capable of black starting (i.e., restoring from electrically blackout) even if the power grid is in power outage during a disaster. It should be noted that as an example of a voltage control inverter, an UPS or the like is known; however, the UPS, which uses a CVCF (Constant Voltage Constant Frequency) control, does not contribute to keeping a frequency of a power grid unlike a voltage control inverter which has drooping characteristics for the output frequency and voltage amplitude.

A known example of a technology for controlling a voltage control inverter is a method of enabling black start by remotely operating a power grid during power outage to output a voltage.

However, in the case where the voltage control inverter remotely receives a control command from an upper control system, if the voltage control inverter black starts, it results in giving an electric shock to a worker who is performing inspection within a power grid, if any, or to equipment.

BRIEF DESCRIPTION OF THE DRAWINGS

FIG. 4 is a flowchart illustrating an example of an operation for starting black start by local operation even in a case a remote control mode according to the present embodiment is on.

DETAILED DESCRIPTION

According to one embodiment, a voltage control inverter interconnectable with a power system, includes receiving circuitry configured to receive a first control command for outputting a voltage to the power system; and controlling circuitry configured to execute the first control command to output the voltage to the power system. The controlling circuitry is configured to skip to execute the first control command in response to the first control command being received during a period in which the power system is in a first state that is different from a normal state.

Description will be made below on embodiments of the present invention with reference to the drawings.

Figure 1:
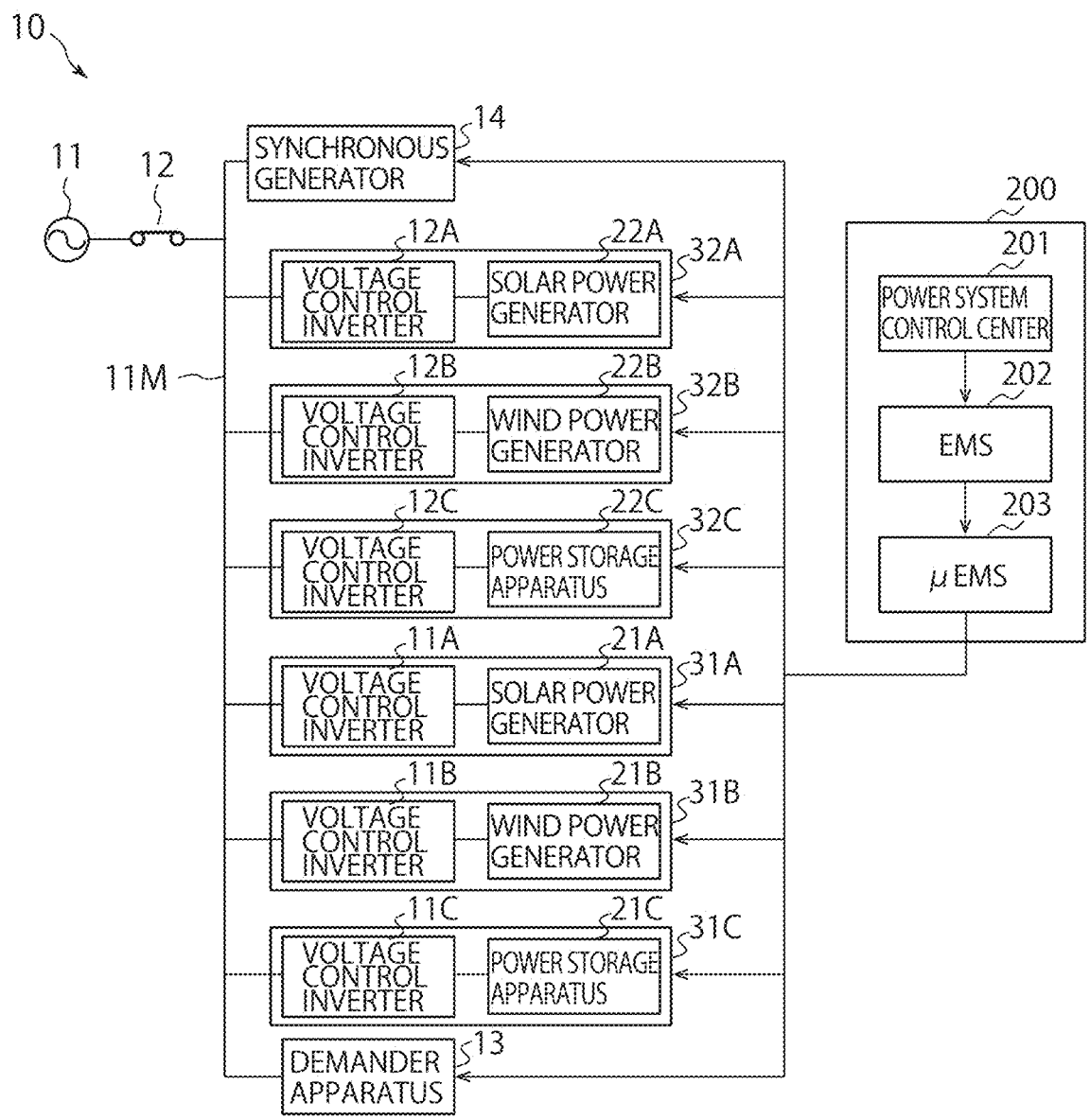
FIG. 1 illustrates an overall configuration of an energy control system according to the present embodiment.

FIG. 1 illustrates an overall configuration of an energy control system 10 according to the embodiment of the present disclosure. A power grid (or power system) 11 is connected through a switch device 12 to distributed power sources, that is, power source apparatuses 31A, 31B, 31C, 32A, 32B, and 32C, a demander apparatus 13, and a synchronous generator 14. The power source apparatuses 31A, 31B, 31C, 32A, 32B, and 32C include voltage control inverters 11A, 11B, 11C, 12A, 12B, and 12C and power supply apparatuses 21A, 21B, 21C, 22A, 22B, and 22C connected to those voltage control inverters, respectively. Specifically, the power supply apparatuses 21A and 22A are solar power generators, the power supply apparatuses 21B and 22B are wind power generators, and the power supply apparatuses 21C and 22C are power storage apparatuses in the form of chargeable/dischargeable secondary batteries.

Within the power grid 11, a partial system where the power source apparatuses 31A, 31B, 31C, 32A, 32B, and 32C, the demander apparatus 13, and the synchronous generator 14 are connected provides a microgrid 11M. The microgrid 11M is a part of the power grid 11.

The voltage control inverters 11A, 11B, 11C, 12A, 12B, and 12C (the voltage control inverter 11A, etc.) are electronic apparatuses that convert an electric power supplied from the solar power generator 21A, the wind power generator 21B, the power storage apparatus 21C, the solar power generator 22A, the wind power generator 22B, and the power storage apparatus 21C to alternating current, respectively, thereby generating and outputting a voltage or an electric power for use by the demander apparatus 13. A voltage control inverter is also referred to as a power converter or a PCS (Power Conditioning System). The demander apparatus 13 is a load apparatus that consumes an electric power at home, a school, a factory, a company, or the like, a power storage apparatus that stores a redundant electric power in the power grid 11, or the like. Although only the single demander apparatus 13 is illustrated in the figure, there may be a plurality of demander apparatuses 13.

In the case of occurrence of an abnormality such as accident in the power grid 11 or during a work or an emergency such as a fire, the switch device 12 is opened. In the case of power outage or when the switch device 12 is opened, the microgrid 11M is electrically disconnected (cut off) from the power grid 11 with no electric power supplied thereto. In this case, the microgrid 11M functions as a distributed power source system capable of independently operating using a renewable energy from the power generators and the power storage apparatuses.

The synchronous generator 14 is an alternating-current power generator that generates and provides an alternating-current power to the power grid 11 or the microgrid 11M. The synchronous generator 14 includes an emergency power generator, a continuous power generator, or both. The emergency power generator is, by way of example, an emergency diesel power generator. The emergency diesel power generator, which is usually not in operation, starts operating in response to instructions from a worker in the case of cutoff from the power grid 11 due to occurrence of an abnormality or the like in the power grid 11. The instructions from the worker may be given using a switch such as a button provided in the synchronous generator 14. Alternatively, the instructions from the worker may be given by sending, wirelessly or by wire, an instruction signal from a terminal usable by the worker or from a terminal usable by a person in charge of monitoring in a control center. The terminal operable by the worker is, for example, a tablet terminal for maintenance. The terminal operable by the person in charge of monitoring is, for example, a server that monitors the microgrid 11M online or offline. A configuration without the synchronous generator 14 is also acceptable. In the case where a synchronous power generator is used for emergency and continuous use, the characteristics of a governor of the power generator are switched between isochronous characteristics and droop characteristics in use in some cases. In the case of the isochronous characteristics, the rotational speed of the power generator is controlled to be constant irrespective of a connected load. In the case of the droop characteristics, the rotational speed of the power generator changes depending on the magnitude of a connected load, which enables sharing of the load with another synchronous power generator in accordance with a load change or the like. In some cases, the characteristics of the governor are switched to the droop characteristics for continuous use for system interconnection, and switched to the isochronous characteristics for off-grid use such as emergency use.

During a normal operation, for example, in the case where no abnormality such as accident occurs in the power grid 11, the switch device 12 is closed. With the switch device 12 closed, voltages are output (electric power is supplied) from the solar power generators 21A and 22A, the wind power generators 21B and 22B, and the power storage apparatuses 21C and 22C through the respective voltage control inverter 11A, etc., connected thereto to the power grid 11. The supplied electric power is supplied to the demander apparatus 13. The electric power supplied from at least any one of the solar power generator 21A, the wind power generator 21B, the solar power generator 22A, and the wind power generator 22B may be supplied to the power storage apparatus 21C or the power storage apparatus 22C to be stored. In the case of, for example, occurrence of an abnormality such as accident in the power grid 11, the switch device 12 is opened and the voltage control inverters 11A, 11B, 12A, 12B, etc., become connected to the microgrid 11M, which is cut off from the power grid 11.

The microgrid 11M receives a control command from an upper control system 200, performing an electric power control of the power grid and the microgrid 11M based on the control command from the upper control system 200. In other words, the electric power control of the power grid and the microgrid 11M is remotely performed. A specific example of the control command is a frequency command value, an active power command value, a voltage command value, or a reactive power command value. The control command can include all or a part of these command values.

Here, the upper control system 200 has a hierarchical architecture with a plurality of levels, including, for example, a power system control center 201, an EMS 202, and a µEMS 203. The power system control center 201 is an uppermost control system. The EMS 202 receives a command from the power system control center 201 and controls the µEMS 203 (gives a command to the µEMS 203). The µEMS 203 receives the command from the EMS 202 and controls the power source apparatuses 31A to 31C, 32A to 32C, etc., The µEMS 203, by way of example, corresponds to a first energy management system. The EMS 202, by way of example, corresponds to a second energy management system. The power system control center 201, by way of example, corresponds to a central command system. However, such correspondence is merely exemplary and other correspondence is also possible. For example, the first energy management system may correspond to the EMS 202 or the power system control center 201.

In the case of occurrence of power outage or an accident in the power grid 11 and the microgrid 11M, a stop command from the upper control system 200 for maintenance and inspection or an islanding detection function of the power source apparatuses causes the operation of the voltage control inverter 11A, etc., to stop. In the case where maintenance and inspection or the like is completed, the voltage control inverter 11A, etc., can be activated in response to receiving an activation signal remotely provided from the upper control system 200, that is, a control command for instructing the voltage control inverter 11A, etc., to output a voltage. In other words, the voltage control inverter 11A etc., which function as a voltage source by themselves, can output a voltage even during power outage, achieving black start. It should be noted that in the case where a current control inverter is used as an inverter instead of a voltage control inverter, a current cannot be output without referring to a voltage of the power grid 11, so that no voltage can be output during power outage of the power grid 11 and black start cannot be achieved.

If the voltage control inverter 11A, etc., are activated in response to receiving an activation signal while a worker performs inspection during power outage of the power grid 11, equipment connected to the microgrid 11M or the maintenance person would have an electric shock due to a voltage output from the voltage control inverter 11A, etc.

To prevent this, in the case of receiving a control command (activation signal) for outputting a voltage from the upper control system 200 during a period in which the microgrid 11M is cut off or the like from the power grid 11, the voltage control inverter 11A, etc., according to the present embodiment do not execute the control command (i.e., skip to execute the control command) or wait before executing the command. In other words, the voltage control inverter 11A autonomously determines to ignore the control command, thus not starting voltage output (not being activated). Examples of the case where the microgrid 11M is cut off from the power grid 11 include the case where the power grid 11 has power outage or system accident. Examples of a method for the voltage control inverter 11A, etc., to determine whether or not the microgrid 11M is cut off from the power grid 11 include a method where it is determined whether or not a voltage of the microgrid 11M falls within a predetermined voltage range. As long as the voltage of the microgrid 11M is, by way of example, 0 [V] or within an allowable error range, the microgrid 11M can be determined to be cut off from the power grid 11. The microgrid 11M being cut off from the power grid 11 is considered as an example of the power grid 11 being in a first state different from a normal state. Other examples of the first state will be described later. The voltage control inverter 11A, etc., according to the present embodiment will be described below in detail.

Figure 2:
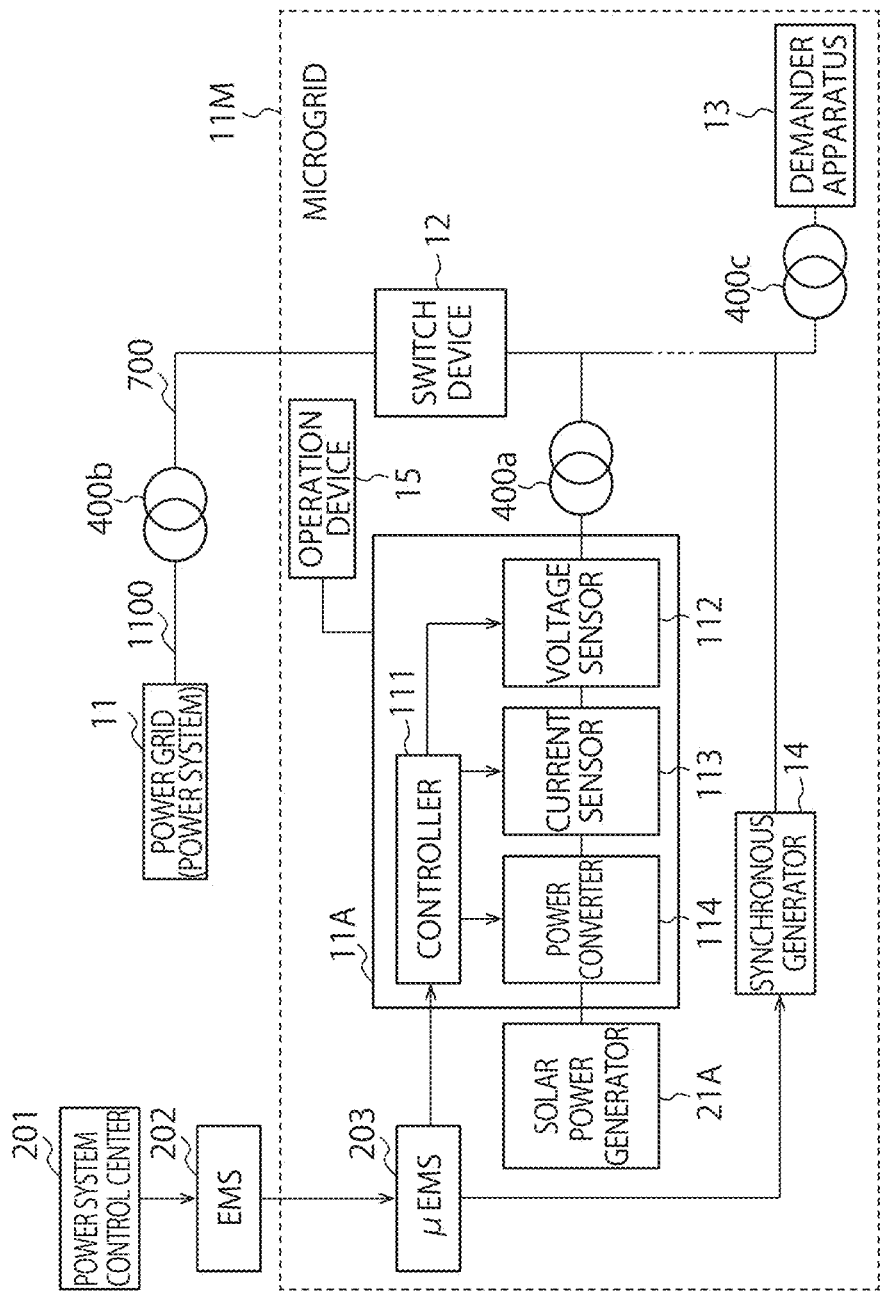
FIG. 2 is a block diagram of a voltage control inverter according to the present embodiment.

FIG. 2 is a block diagram of a whole system including the voltage control inverter 11A, etc., according to the present embodiment. In the figure, the voltage control inverters other than the voltage control inverter 11A, i.e., the voltage control inverters 11B, 11C, 12A, 12B, and 12C, are not illustrated. These voltage control inverters each have the same block as the voltage control inverter 11A except that the connected power supply apparatus (the power storage apparatus or the power generator) is different from that of the voltage control inverter 11A. Accordingly, only the voltage control inverter 11A will be described below.

During the normal operation of the power grid 11, an electric power is transmitted from the power grid 11 via an electric transmission network 1100. The transmitted electric power is supplied to the microgrid 11M via an electric distribution network 700 after a voltage is converted through a transformer 400b.

The voltage control inverter 11A is connected to the microgrid 11M through a transformer 400a. The voltage control inverter 11A includes a controller 111 (controlling circuitry), a voltage sensor (measurement apparatus) 112, a current sensor 113, and a power converter 114. The controller 111 is connected to the voltage sensor 112, the current sensor 113, and the power converter 114. The voltage sensor 112 detects a voltage of the microgrid 11M (a voltage at an inverter output terminal) and outputs information indicating the detected voltage to the controller 111. The current sensor 113 detects a current of the microgrid 11M (a current at the inverter output terminal) and outputs information indicating the detected current to the controller 111.

The controller 111 receives a control command from the μEMS 203 and executes the received control command, thereby controlling the voltage control inverter 11A. The controller 111 also functions as a receiver (receiving circuitry) that receives a control command. The controller 111 may communicate with an operation device 15 and receive a control command. The operation device 15 may be integral with the power source apparatus 31A or, alternatively, a terminal operable by a worker or a terminal operable by a person in charge of monitoring in a control center. A communication network may be a wireless communication network such as a wireless LAN, a mobile network, or Bluetooth or a wired communication network such as Ethernet or a serial communication cable. The controller 111 may communicate with at least one of the other voltage control inverters 11B, 11C, 12A, 12B, and 12C, the demander apparatus 13, and the synchronous generator 14. The controller 111 may be able to switch between a first control mode, in which voltage output is controlled based on a control command from the upper control system 200 through the communication network, and a second control mode, in which voltage output is controlled based on a control command input from the operation device 15. The control command to be received through the communication network corresponds to, by way of example, a first control command and the control command to be received from the operation device 15 corresponds to, by way of example, a second control command.

The power converter 114 has a function to turn a direct-current voltage from the solar power generator 21A into an alternating-current voltage and a function to output the converted alternating-current power to the microgrid 11M or the power grid 11. Further, the power converter 114 may be configured to be able to output, as an islanding detection signal of the voltage control inverter 11A, a reactive power or an active power or a reactive power and an active power under the control of the controller 111.

The voltage or electric power converted by the power converter 114 is converted to a more suitable voltage by the transformer 400a and output to the demander apparatus 13, etc. The electric power output to the demander apparatus 13 is converted to a more suitable voltage by the transformer 400c and supplied to the demander apparatus 13. It should be noted that in the case where a reverse power flow is acceptable, the output electric power is transmitted through the electric distribution network 700, the transformer 400b, and the electric transmission network 1100 to the power grid 11 in some cases.

Figure 3:
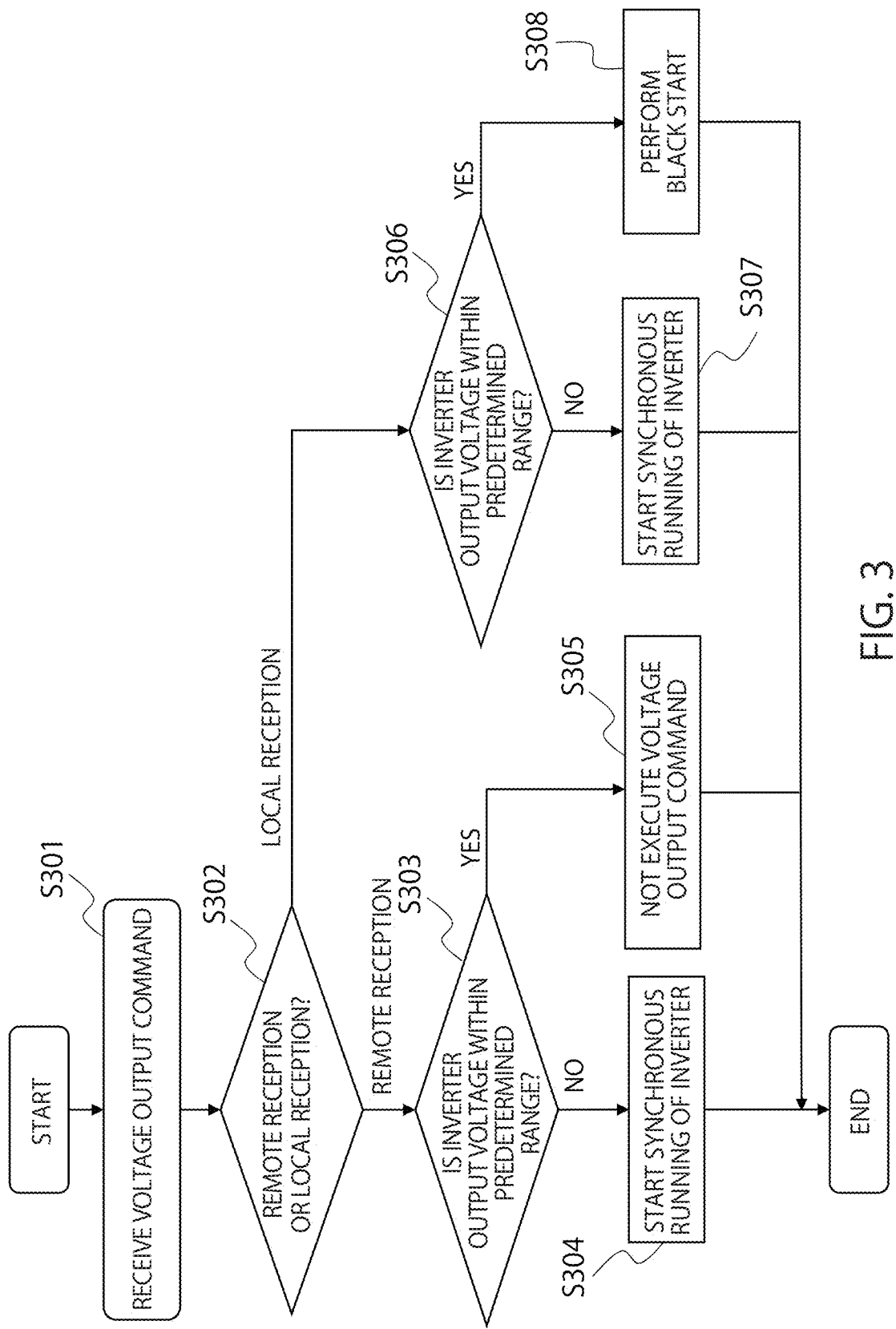
FIG. 3 is a flowchart schematically illustrating an example of an overall operation of the voltage control inverter of the present embodiment.

FIG. 3 is a flowchart schematically illustrating an example of an operation of the voltage control inverter 11A according to the present embodiment.

First, the controller 111 of the voltage control inverter 11A receives a control command, or voltage output command (S301). The controller 111 determines whether the voltage output command has been remotely received (the voltage output command being received by a remote operation) or locally received (the voltage output command being received by a local operation) (S302). Here, the term "remote reception" means receiving a control command from the upper control system 200 through a communication network. The term "local reception" means receiving a control command input from the operation device 15. In the case of the remote reception, the process proceeds to step S303. In the case of the local reception, the process proceeds to step S306.

In the case of the remote reception, the controller 111 determines whether or not a voltage (a voltage of the microgrid 11M or a voltage at the inverter output terminal) measured by the voltage sensor 112 is within a predetermined range (S303). In the case where the voltage is out of the predetermined range (NO), the process proceeds to step S304. In the case where it is within the predetermined range (YES), the process proceeds to step S305. Here, the term "predetermined range" refers to, by way of example, 0 [V] or an allowable error range therearound, including 0 [V]. The voltage being within the predetermined range is an example of the power grid 11 being in the first state, which is different from the normal state.

In the case where the voltage is out of the predetermined range (NO), the controller 111 executes the voltage output command. In other words, the controller 111 starts synchronous running of the voltage control inverter 11A (S304). The term "synchronous running" refers to voltage output being performed with synchronization in phase, frequency, and amplitude with the power grid 11. In the case where the voltage is out of the predetermined range, the power grid 11 is in a normal operation state, so that the voltage control inverter 11A is activated with safety, if necessary. In contrast, in the case where the voltage is within the predetermined range (YES), the controller 111 does not execute the received voltage output command (S305). In other words, the controller 111 ignores the received electric power output command or waits before executing the electric power output command. In the case where the voltage is within the predetermined range, electric power supply to the microgrid 11M is cut off (the synchronous generator 14 is also not activated) due to power outage of the power grid 11, or the like. In this case, a worker or equipment would have an electric shock as a result of activation of the voltage control inverter 11A; however, such a trouble is avoided, since the voltage output command is not executed.

Likewise, in the case of the local reception, the controller 111 determines whether or not the voltage measured by the voltage sensor 112 is within the predetermined range (S306). In the case where the voltage is out of the predetermined range (NO), the process proceeds to S307. In the case where it is within the predetermined range (YES), the process proceeds to step S308.

In the case where the voltage is out of the predetermined range (NO), the controller 111 starts the synchronous running of the voltage control inverter 11A (S307) in the same manner as in step S304.

Likewise, in the case where the voltage is within the predetermined range (YES), the controller 111 executes the voltage output command, starting output of a voltage. In other words, the controller 111 performs black start. This is because even though the voltage is within the predetermined range, no trouble such as electric shock is supposed to occur as a result of activation of the voltage control inverter 11A unless a chief electrical engineer or a supervisor of the chief electrical engineer determines that there is a risk of occurrence of an electric shock accident or the like.

In the example in FIG. 3, the predetermined range is assumed to be 0 [V] or the allowable error range therearound, including 0 [V]. As a modification example of the predetermined range, for a standard voltage of 100 V as a voltage for a low-voltage demander as set forth in the Electricity Business Act, Art. 26 and the Ordinance for Enforcement of the Electricity Business Act, Art. 38, the predetermined range may be a range other than a range of 101±6 V (a voltage range in the normal state). In other words, the predetermined range may be a range less than 95 [V] or more than 107 [V]. The voltage being in the range less than 95 [V] or more than 107 [V] is an example of the power grid 11 being in the first state, which is different from the normal state.

Alternatively, for a standard voltage of 200 V, the predetermined range may be a range other than a range of 202±20 V (a voltage range in the normal state). In other words, the predetermined range may be a range less than 182 [V] or more than 222 [V]. The voltage being in the range less than 182 [V] or more than 222 [V] is an example of the power grid 11 being in the first state, which is different from the normal state.

In the case where the voltage is out of the range of 101±6 V for a standard voltage of 100 V or out of the range of 202±20 V for a standard voltage of 200 V, it can be determined that, for example, there is an accident occurring in a part of the power grid 11 (the power grid 11 is not in the normal state). In other words, occurrence of a situation where an electric power fails to be normally supplied from the power grid 11 can be determined. In this case, if the controller 111 executes the remotely received control command and activates the voltage control inverter 11A, or activating the power source apparatus 31A, there is a risk of occurrence of an electric shock accident or the like.

Figure 4:
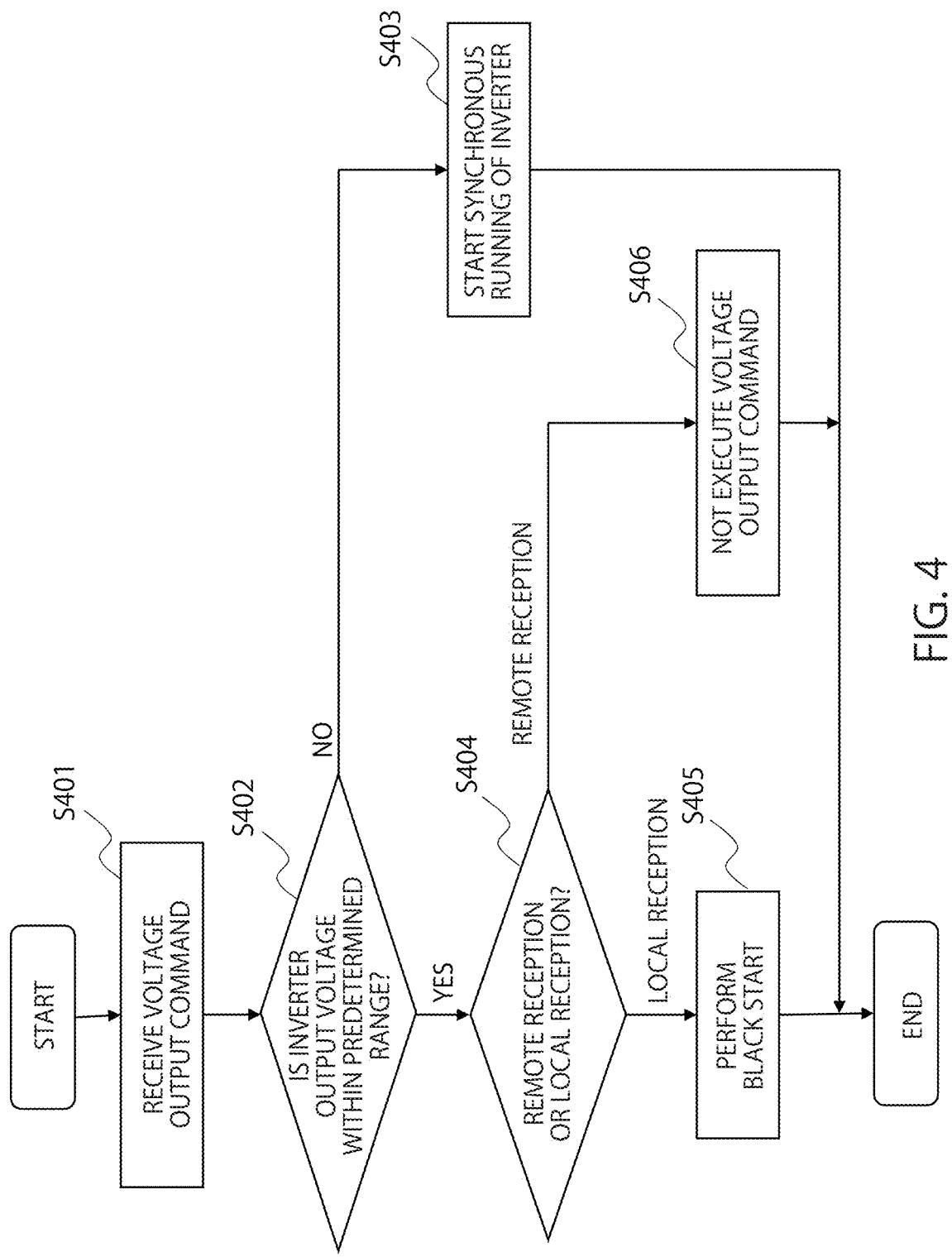

FIG. 4 is a flowchart schematically illustrating another example of the operation of the voltage control inverter 11A according to the present embodiment. FIG. 4 illustrates an example of an operation where black start is started in response to a control command being locally received even in the case where the power source apparatus 31A according to the present embodiment is in a remote control mode.

The power source apparatus 31A is, by way of a premise, set in the remote control mode (in other words, setting is made to accept remote reception of a control command). The controller 111 of the voltage control inverter 11A of the power source apparatus 31A receives a voltage output command (S401).

The controller 111 determines whether or not a voltage measured by the voltage sensor 112 is within the predetermined range (S402). An example of the predetermined range is 0 [V] or an allowable error range therearound, including 0 [V] as in the description of FIG. 3. In the case where the voltage is within the predetermined range (YES), the process proceeds to step S404. In the case where it is out of the predetermined range (NO), the process proceeds to step S403.

In the case where the voltage is out of the predetermined range (NO), the controller 111 starts the synchronous running of the inverter (S403).

In the case where the voltage is within the predetermined range (YES), the controller 111 determines whether the voltage output command has been locally received or remotely received (S404). Here, as described above, the term "remote reception" means that the control command has been remotely received from the upper control system 200 (e.g., the μEMS 203), whereas the term "local reception" means that the control command has been received from the operation device 15. In the case of the local reception, the process proceeds to step S405. In the case of the remote reception, the process proceeds to step S406.

In the case of the local reception, the controller 111 executes the voltage output command, starting output of a voltage from the voltage control inverter 11A. In other words, the controller 111 starts black start. This is because even though the voltage is within the predetermined range, no trouble such as electric shock is supposed to occur as a result of activation of the voltage control inverter 11A unless a chief electrical engineer or a supervisor of the chief electrical engineer determines that there is a risk of occurrence of an electric shock accident or the like.

In the case of the remote reception, the controller 111 does not execute the voltage output command (S406). In other words, the controller 111 ignores the received electric power output command or waits before executing the electric power output command. In the case where the voltage is within the predetermined range, electric power supply to the microgrid 11M is cut off (the synchronous generator 14 is also not activated) due to power outage of the power grid 11, or the like. In this case, a worker or equipment would have an electric shock as a result of activation of the voltage control inverter 11A; however, such a trouble is avoided, since the voltage output command is not executed.

In the case of the flowchart in FIG. 4, a modification example of the predetermined range is available as in the description of the flowchart in FIG. 3.

The power supply apparatuses (the solar power generator, the wind power generator, or the power storage apparatus) are connected to the voltage control inverter 11A, etc., illustrated in FIG. 1; however, a configuration where the power supply apparatuses are not connected is acceptable.

In the present embodiment, the upper control system 200 has the hierarchical architecture with three levels: the control system at the uppermost level, i.e., the power system control center 201, the control system at the middle, i.e., the EMS 202, and the lowermost level in the upper control system 200, i.e., the μEMS 203; however, a different architecture is acceptable. For example, a single-level hierarchical architecture where the power system control center 201 is directly connected to the voltage control inverter 11A, etc., not through the EMS 202, etc., or a two-level architecture where the power system control center 201 controls the μEMS 203 is also acceptable.

In the present embodiment as described above, in the case where electric power supply to the microgrid 11M is cut off, the voltage control inverter 11A, etc., do not execute the remotely received voltage output command. This makes it possible to prevent a worker or equipment to have an electric shock as a result of the voltage control inverter 11A, etc., starting voltage output while the worker carries out an inspection of the microgrid 11M. In other words, safety in maintenance during power outage or occurrence of a system accident is provided. However, in the case where the electric power to the microgrid 11M is cut off due to power outage or the like, the voltage control inverter 11A, etc., execute a voltage output command even while a worker carries out an inspection of the power source apparatus as long as the voltage output command is locally received from the worker. This makes it possible to prevent an incident such as occurrence of an electric shock accident of the worker and perform black start.

Description will be made below on another embodiment of the present invention. A block diagram of the other embodiment is the same as FIG. 1 except that a part or all of the voltage control inverter 11A, etc., do not have to have the functions as in the above-described embodiment. In other words, a part or all of the voltage control inverter 11A, etc., may be existing voltage control inverters. However, a part or all of the voltage control inverter 11A, etc., may have the functions as in the above-described embodiment. The other embodiment of the present invention is characterized by the upper control system 200. The power system control center 201, the EMS 202, and the μEMS 203 are each in the form of a computer system including a processor such as a CPU, a memory, an input/output interface, a communicator, etc. The functions of the power system control center 201, the EMS 202, and the μEMS 203 may be implemented by causing a computer to execute a program. Description will be made below on an example of an operation of each of the power system control center 201, the EMS 202, and the μEMS 203 according to the other embodiment.

Figure 5:
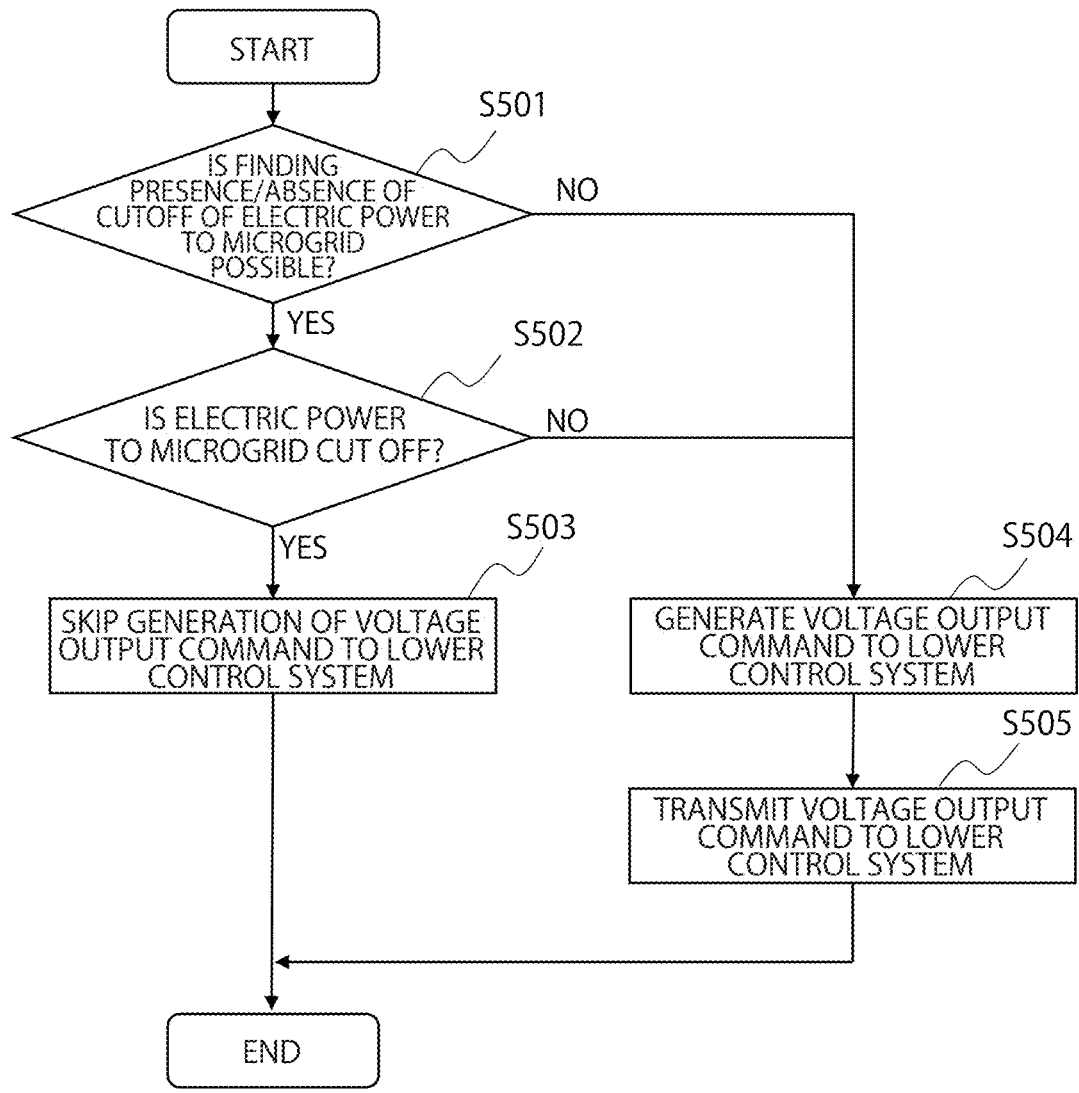
FIG. 5 is a flowchart schematically illustrating an example of an operation of a power system control center according to the present embodiment.

FIG. 5 is a flowchart schematically illustrating an example of an operation of the power system control center 201 according to the present embodiment. The power system control center 201, which is a part of the upper control system 200, is a control system at the uppermost level in the upper control system 200.

The power system control center 201 determines whether or not it is possible to find presence/absence of cutoff of the electric power to the microgrid 11M (S501). In the case where it is possible, the process proceeds to step S502. In the case where it is not possible, the process proceeds to step S504.

The power system control center 201 determines whether or not the electric power to the microgrid 11M is cut off (S502). In the case where it is cut off, the process proceeds to S503. In the case where it is not cut off, the process proceeds to step S504. Being cut off means that the power grid 11 (or the microgrid 11M) is in the first state, which is different from the normal state.

In the case where the electric power to the microgrid 11M is cut off, the power system control center 201 skips generation of a voltage output command (a command) to the EMS 202 (S503). This makes it possible to prevent in advance a trouble (an electric shock of a worker or the like) that occurs as a result of a voltage output command being transmitted to the voltage control inverter of the microgrid 11M and executed.

In the case where the electric power to the microgrid 11M is not cut off, the power system control center 201 generates a voltage output command to the lower control system, for example, the EMS 202 (S504). The power system control center 201 transmits the generated voltage output command to the lower control system, i.e., the EMS 202, (S505).

As a modification example, in step S501, it may be determined whether or not it is possible to find whether or not the voltage of the microgrid 11M is within a normal range instead of the presence/absence of cutoff of the electric power to the microgrid 11M. The normal range is, for example, a range of 101±6 V for a standard voltage of 100 V or a range of 202±20 V for a standard voltage of 200 V. In the case where it is not possible to find whether or not the voltage is within the normal range, the process proceeds to step S504. In the case where it is possible, it may be determined whether or not the voltage is within the normal range in step S502. In the case where the voltage is within the normal range, the process proceeds to step S504. In the case where it is not within the normal range, the process proceeds to step S503. In the case where the voltage is within the normal range, the power grid 11 (or the microgrid 11M) is in the normal state. In the case where the voltage is out of the normal range, the power grid 11 (or the microgrid 11M) is in the first state, which is different from the normal state.

Figure 6:
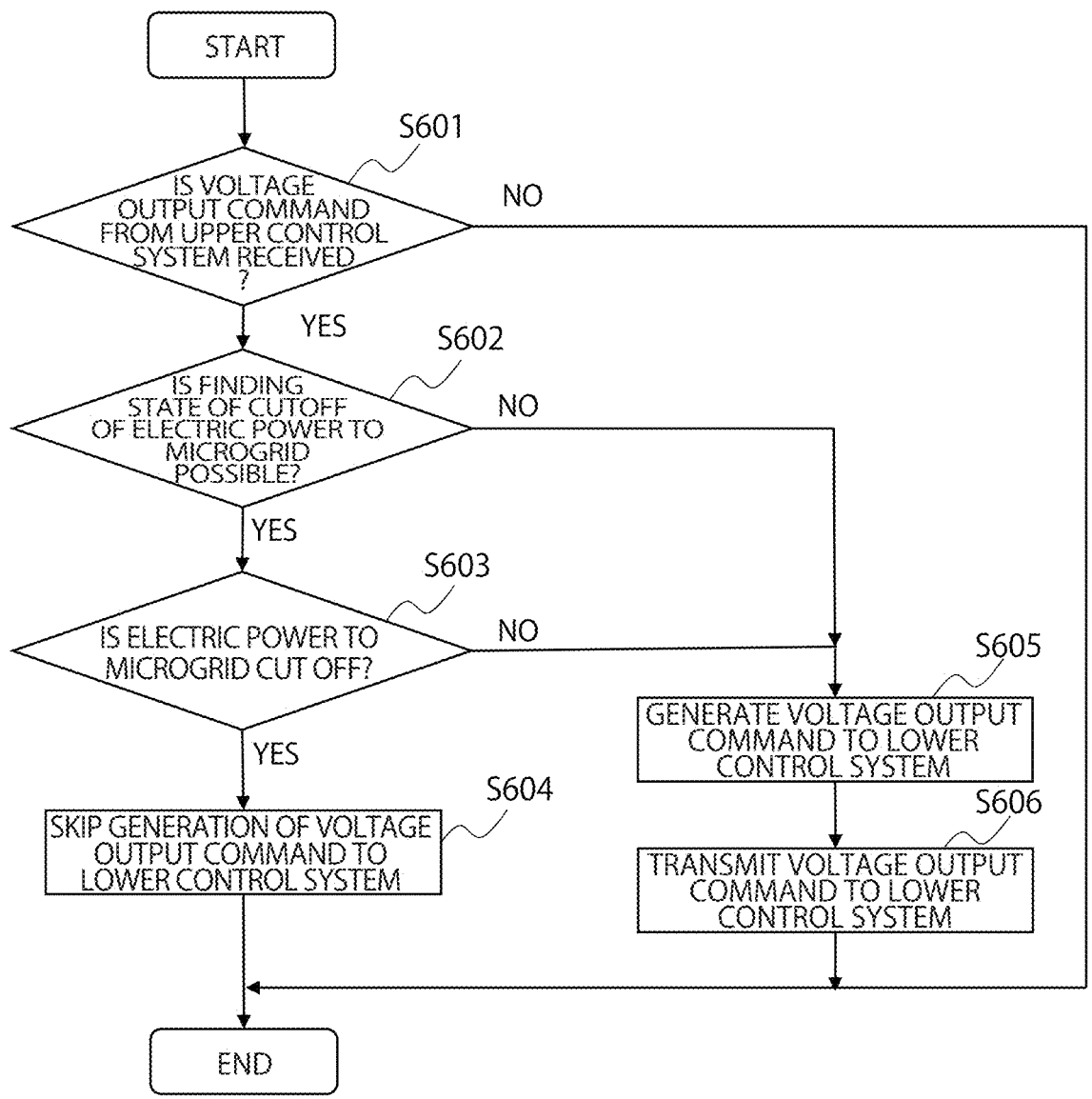
FIG. 6 is a flowchart schematically illustrating an example of an operation of an EMS according to the present embodiment.

FIG. 6 is a flowchart schematically illustrating an example of an operation of the EMS 202 according to the present embodiment. The EMS 202, which is a part of the upper control system 200, has the power system control center 201 as a control system at the upper level and the μEMS 203 as a control system at the lower level.

The EMS 202 determines whether or not a voltage output command (a second command) has been received from the upper control system, i.e., the power system control center 201, (S601). In the case where a voltage output command has been received, the process proceeds to step S602. In the case where no voltage output command has been received, the process is terminated.

The EMS 202 determines whether or not it is possible to find presence/absence of cutoff of the electric power to the microgrid 11M (S602). In the case where it is possible, the process proceeds to step S603. In the case where it is not possible, the process proceeds to step S605.

In the case where the electric power to the microgrid 11M is cut off, the EMS 202 skips generation of a voltage output command (a first command) to a lower control system, for example, the μEMS 203 (S604). This makes it possible to prevent in advance a trouble (an electric shock of a worker or the like) that occurs as a result of a voltage output command being transmitted to the voltage control inverter of the microgrid 11M and executed.

In the case where the electric power to the microgrid 11M is not cut off, the power system control center 201 generates a voltage output command to the lower control system, for example, the μEMS 203 (S604). The EMS 202 transmits the generated voltage output command to the lower control system, i.e., the μEMS 203, (S606).

The modification example as in the description of FIG. 5 is also applicable to an operation in the flowchart in FIG. 6.

Figure 7:
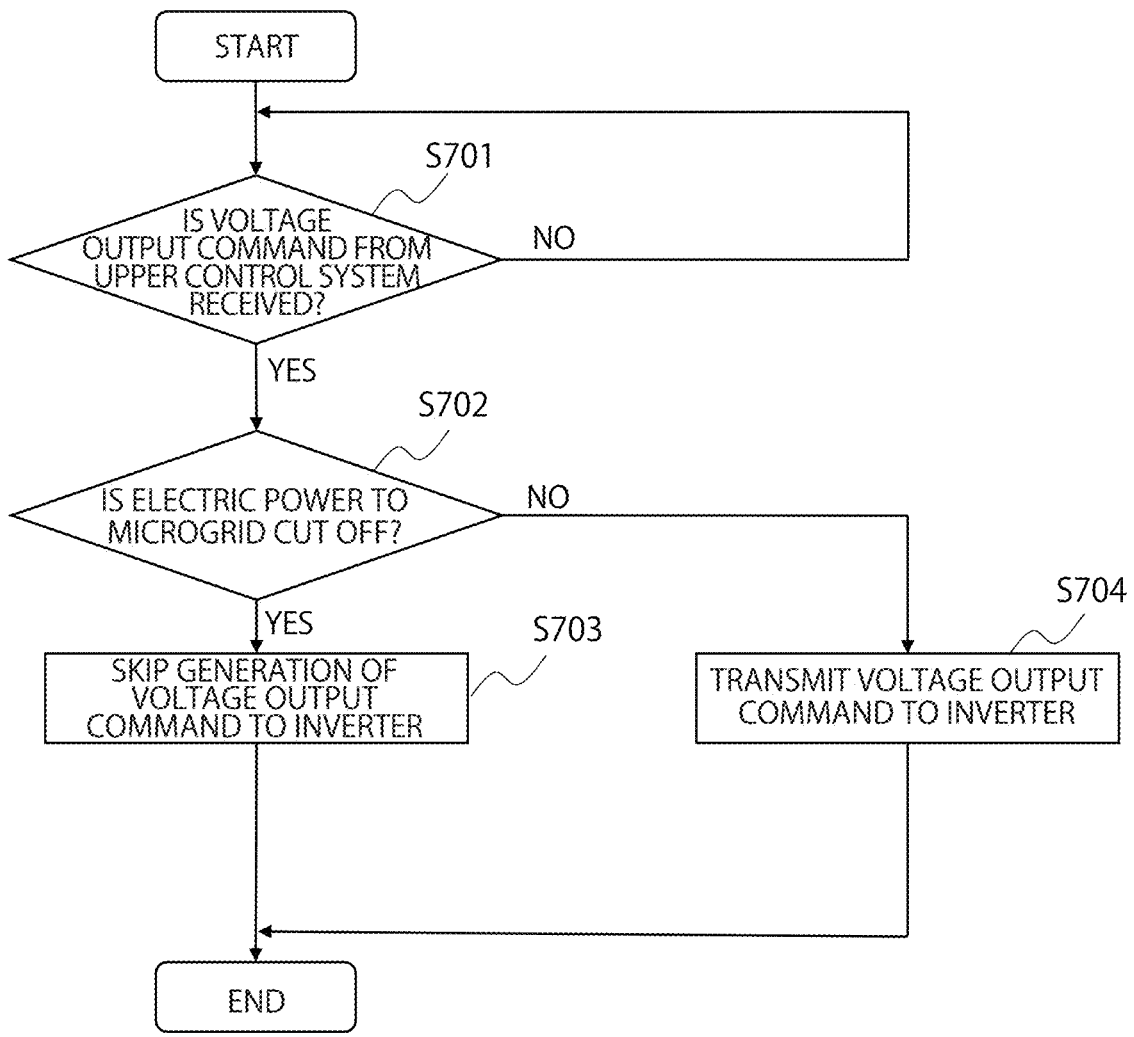
FIG. 7 is a flowchart schematically illustrating an example of an operation of a μEMS according to the present embodiment.

FIG. 7 is a flowchart schematically illustrating an example of an operation of the μEMS 203 according to the present embodiment. The μEMS 203, which is a part of the upper control system 200, corresponds to the lowermost level in the upper control system 200 and controls the power source apparatus 31A, etc. The μEMS 203 is connected to the controller 111 of the voltage control inverter 11A, etc., by wire or wirelessly for communication.

The μEMS 203 determines whether or not a voltage output command has been received from the upper control system, i.e., the EMS 202, (S701). In the case where a voltage output command has been received, the process proceeds to step S702. In the case where no voltage output command has been received, step S701 is repeated again.

The μEMS 203 determines whether or not the electric power to the microgrid 11M is cut off (S702). In the case where it is cut off, the process proceeds to step S703. In the case where it is not cut off, the process proceeds to step S704.

In the case where the electric power to the microgrid 11M is cut off, the μEMS 203 skips generation of a voltage output command to the voltage control inverter 11A, etc., (S703). This makes it possible to prevent in advance a trouble (an electric shock of a worker or the like) that occurs as a result of a voltage output command being transmitted to the voltage control inverter of the microgrid 11M and executed. In the case where the electric power to the microgrid 11M is not cut off, the μEMS 203 transmits a voltage output command to the voltage control inverter 11A, etc., (S704).

The modification example as in the description of FIG. 5 is also applicable to an operation in the flowchart in FIG. 7.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A voltage control inverter interconnectable with a power system, comprising:
    receiving circuitry configured to receive a first control command for outputting a voltage to the power system; and
    controlling circuitry configured to execute the first control command to output the voltage to the power system,
    wherein the controlling circuitry is configured to skip to execute the first control command in response to the first control command being received during a period in which the power system is in a first state that is different from a normal state.

2. The inverter according to claim 1, further comprising a measurement apparatus configured to measure a voltage of the power system, wherein
    the controlling circuitry is configured to determine that the power system is determined to one of the first state or the normal state based on the measured voltage.

3. The inverter according to claim 2, wherein
    the controlling circuitry is configured to determine that the power system is in the first state in response to the measured voltage being substantially 0 [V].

4. The inverter according to claim 2, wherein
    the controlling circuitry is configured to determine that the power system is in the first state in response to the measured voltage being out of a range from 95 [V] to 107 [V], both inclusive or in response to the measured voltage being out of a range from 182 [V] to 222 [V], both inclusive.

5. The inverter according to claim 1, further comprising an operation device to input a second control command for outputting a voltage to the power system, wherein
    the receiving circuitry is configured to receive the first control command through a communication network, and
    the controlling circuitry is configured to execute the second control command to output the voltage to the power system in response to the second control command being input from the operation device during a period in which the power system is in the first state.

6. The inverter according to claim 1, further comprising an operation device to input a second control command for outputting a voltage to the power system, wherein
    the receiving circuitry is configured to receive the first control command through a communication network,
    a first control mode in which voltage output is controlled based on the first control command received through the communication network and a second control mode in which voltage output is controlled based on the second control command input from the operation device are switchable, and
    the controlling circuitry is configured to execute the second control command even in the first control mode in response to the second control command being input from the operation device during a period in which the power system is in the first state.

7. A power source apparatus comprising:
    a voltage control inverter according to claim 1; and
    a power generator configured to generate an electric power, wherein
    the controlling circuitry is configured to output the voltage based on the electric power generated by the power generator.

8. An energy control system comprising:
    a voltage control inverter interconnectable with an power system; and
    a first energy management system configured to manage the voltage control inverter, wherein
    the voltage control inverter comprises receiving circuitry configured to receive a control command for outputting a voltage to the power system and controlling circuitry configured to execute the control command to output the voltage to the power system, and
    the first energy management system is configured to generate the control command, transmit the control command to the voltage control inverter, and skip to generation the control command in response to detecting that the power system is in a first state different from a normal state.

9. The energy control system according to claim 8, wherein
    the first energy management system is configured to generate the control command in response to a first command that instructs to output a voltage to the power system from a second energy management system managing the first energy management system, and the first energy management system is configured to skip to generate the control command in response to detecting that the power system is in the first state even when receiving the first command.

10. The energy control system according to claim 9, comprising the second energy management system, wherein
    the second energy management system is configured to generate the first command and transmit the first command to the first energy management system, and the second energy management system is configured to skip to generation the first command in response to detecting that the power system is in the first state.

11. The energy control system according to claim 10, wherein the second energy management system is configured to: generate the first command in response to a second command that instructs to output a voltage to the power system from a central command system managing the power system; and skip to generate the first command in response to detecting that the power system is in the first state even when receiving the second command.

12. The energy control system according to claim 11, comprising a central command system configured to manage the second energy management system, wherein the central command system is configured to generate the second command and transmit the second command to the second energy management system, and the central command system is configured to skip to generate the second command in response to detecting that the power system is in the first state.

13. A voltage control method performed by a voltage control inverter interconnectable with a power system, comprising:

receiving a first control command for outputting a voltage to the power system; and executing the first control command to output the voltage to the power system and skipping to execute the first control command in response to the first control command being received during a period in which the power system is in a first state that is different from a normal state.

\* \* \* \* \*

UNITED STATES PATENT AND TRADEMARK OFFICE
CERTIFICATE OF CORRECTION

| | |
|---|---|
| PATENT NO. | : 11,539,216 B2 |
| APPLICATION NO. | : 17/469867 |
| DATED | : December 27, 2022 |
| INVENTOR(S) | : Tetsu Shijo et al. |

It is certified that error appears in the above-identified patent and that said Letters Patent is hereby corrected as shown below:

In the Claims

Claim 8, Column 12, Line 36, "an power" should read as --a power--.

Claim 8, Column 12, Line 49, "generation" should read as --generate--.

Claim 10, Column 13, Line 2, "generation" should read as --generate--.

Signed and Sealed this
Fifteenth Day of August, 2023

Katherine Kelly Vidal
*Director of the United States Patent and Trademark Office*